United States Patent [19]
Armistead et al.

[11] 3,964,916
[45] June 22, 1976

[54] CASTING POWDER
[75] Inventors: William H. Armistead; Dominic P. Mamazza, both of Corning, N.Y.; David Rostoker, Monroeville, Pa.; Frank E. Woolley, Painted Post, N.Y.
[73] Assignee: Corning Glass Works, Corning, N.Y.
[22] Filed: Dec. 13, 1974
[21] Appl. No.: 532,328

[52] U.S. Cl.................... 106/38.27; 75/94; 75/96; 106/38.22; 106/38.28; 106/52; 164/82
[51] Int. Cl.² ............... C03C 3/04; B22D 11/00
[58] Field of Search........... 106/38.22, 38.28, 38.27, 106/52; 75/94, 96; 164/82

[56] References Cited
UNITED STATES PATENTS

| | | | |
|---|---|---|---|
| 3,677,325 | 7/1972 | Austin | 164/73 |
| 3,708,314 | 1/1973 | Kishida et al. | 106/38.27 |
| 3,899,324 | 8/1975 | Corbett | 75/94 |
| 3,926,246 | 12/1975 | Corbett et al. | 75/94 |

Primary Examiner—Donald J. Arnold
Assistant Examiner—John Parrish
Attorney, Agent, or Firm—Richard N. Wardell; Clarence R. Patty, Jr.

[57] ABSTRACT
Particulate casting material is applied onto the upper surface of molten steel in a vertical continuous casting mold where it rapidly melts to form a protective flux-lubricant molten glass covering which also flows down between the solidifying cast steel and the mold wall. Casting material is a substantially chemically homogeneous, pre-reacted, but substantially unfused mixture of multiple crystalline phases and preferably in a thorough blend of the mixture with up to 10% by weight finely divided graphite. The mixture: (a) analytically consists essentially of, by weight thereof, 20–45% $SiO_2$, 10–40% CaO and/or SrO and/or BaO, 0–10% $Al_2O_3$, 0–11% $Fe_2O_3$, 5–25% $Na_2O$ and/or $K_2O$, 0–15% MgO and 3–15% F ion; (b) exhibits not more than 2% weight loss upon heating thereof at 900°C. for 1 hour; and (c) uniformly melts at temperatures of molten steel to form a fluid glass having the following viscosity characteristics: 1–80 poises at 1100°C., 0.1–3 poises at 1500°C. and a set point less than 1150°C. The mixture is formed by thoroughly and intimately mixing a batch of ingredients yielding the aforesaid analytical composition and having an aggregate particle sizing, by weight, of at least 75% −120 mesh and at least 60% −200 mesh, and heating the mixed batch at temperature of at least 550°C. to less than 1000°C. for time sufficient to react and chemically combine the $Na_2O$ and $K_2O$ with the other ingredients, to render the resultant mixture substantially chemically homogeneous and to reduce volatiles in that mixture to a level not more than 2% weight loss as aforesaid.

10 Claims, No Drawings

CASTING POWDER

BACKGROUND OF THE INVENTION

Numerous particulate casting materials have been applied to form a glass cover and skin on steel continuously cast into open-top vertical casting molds with varying success in accomplishing the full range of desired functions of a protective flux-lubricant. Illustrative examples are disclosed in U.S. Pat. Nos. 3,052,936; 3,318,363; 3,642,052; 3,649,249; 3,677,325; 3,685,986; 3,704,744; 3,708,314; and 3,788,840. Such materials are variously and synonymously referred to as casting powder, flux powder, slag powder and agent or mixture for protecting or improving continuously cast steel. Typically these casting powders have been either particulate raw material mixtures dried of free water or preformed or prefused glasses or glassy substances which are comminuted to a mechanically flowable particulate form for distribution onto and over the surface of the molten steel in the upper part of the continuous casting mold.

Principal functions of a casting powder are preventing adverse heat loss from and oxidation of the molten steel at the open-top of the mold, removing deoxidation nonmetallic inclusions of alumina or silica from the molten steel by entrainment or dissolving in the fluid glass resulting from heating of the casting powder by the molten steel in contact therewith, and providing lubrication and heat transfer control between the solidified shell of the embryonic steel casting and the mold wall as the casting passes down through the mold. These functions ideally should be preformed in a manner to eliminate and prevent defects in the steel casting, such as entrapment or embedding of nonmetallic inclusions and formation of pin holes, surface cracks and powder mold oscillation marks. The degree to which a casting casting will successfully perform some or all of such functions greatly depends upon a proper balancing of a combination of characteristics, such as rapidity and uniformity of melting of the casting powder, viscosity characteristics of the resulting fluid glass covering from the time it is formed on the top surface of the molten steel in the mold on through the time it is to flow down between the mold wall and solidifying casting surface until it emerges from the bottom of the mold with and as a skin on the casting, and absence of formation of reactive substances from the casting powder in contact with the molten steel that produce defects that are retained in the steel as it solidifies. Rapid but nonuniform melting can lead to defects of unmelted casting powder particle deposits entrapped in the steel casting surface, which may later pop out to leave pin hole defects. It can also cause nonuniform viscosity through the fluid glass covering resulting in the formation of viscous stringers around the mold wall from which viscous globs separate without being uniformly absorbed into the rest of the fluid glass and either become deposits embedded in the surface of the steel casting or interfere with the proper flow of fluid glass covering between the casting surface and mold wall thereby contributing to poor heat transfer control and longitudinal cracking in the casting surface. Even rapid and uniform melting does not insure proper viscosity characteristics as the fluid glass coated steel casting cools while flowing over to the mold wall and moving downward in the mold. If a properly melted glass covering undergoes too rapid rigidification or devitrification, it may develop viscous stringers and/or it may not provide sufficient lubrication and heat transfer control whereby the steel castings suffer defects of cracking and/or oscillation marks on their surfaces. A casting powder that melts too slowly can contribute unmelted particle deposits in the steel casting surface, yield adverse viscosity characteristics that lead to formation of detrimental viscous stringers, and cause inadequate covering for proper lubrication and heat transfer control. Also, a dry casting powder may still contain volatilizable substance (such as chemically combined or absorbed water or carbonate) that detrimentally reacts with the molten steel to cause pin hole and deposit inclusion defects in the casting surfaces. Commonly, casting powders are formed as a glass or prefused material in attempts to provide uniformity of performance characteristics and eliminate adverse effects of volatiles that could react with molten steel. However, we have discovered that, within analytical compositions employed in our invention disclosed herein, casting powders of preformed or prefused glass suffer the detriments of too slowly melting when applied to the surface of molten steel. On the other hand, dry mixtures of commercially available ingredients yielding the same analytical compositions suffer from nonuniform melting characteristics although tending to exhibit very rapid melting.

SUMMARY OF THE INVENTION

We have now discovered a unique casting powder or particulate casting material possessing a proper balancing of combined characteristics of rapid uniform melting, controlled uniform viscosity, solutioning of nonmetallic inclusions without causing substantial local viscosity changes and freedom from detrimental volatiles, and a method of making it. Our invention also comprehends an improved method of continuous casting of steel in which a pool of molten steel is maintained in the upper end of an open-ended, vertical, continuous casting mold, the mold is continuously cooled to solidify molten steel in at least the lower portion thereof as such steel passes downward through the mold and our unique particulate casting material particularly described below is applied onto the upper surface of the molten steel pool to melt thereon to form a protective flux-lubricant molten glass covering which also flows down between the solidifying cast steel and the mold wall.

Our unique casting powder or particulate casting material is composed essentially of a substantially chemically homogeneous, pre-reacted, but substantially unfused mixture which a. analytically consists essentially of, by weight of the mixture:

| Reported Constituent | Broad | Preferred |
| --- | --- | --- |
| $SiO_2$ | 20–45% | 25–40% |
| CaO, SrO, BaO and combinations thereof | 10–40% | 20–35% |
| $Al_2O_3$ | 0–10% | 6–10% |
| $Fe_2O_3$ | 0–11% | 6–11% |
| $Na_2O$, $K_2O$ and combinations thereof | 5–25% | 10–20% |
| MgO | 0–15% | 4–15% |
| F ion | 3–15% | 6–12% | b. exhibits a weight loss upon being heated at 900°C. for one hour of not more than:

| Broad | Preferred |
|---|---|
| 2% | 1% | c. uniformly and rapidly melts at temperatures of molten steel to form a fluid glass having the following viscosity characteristics:

| | Broad | Preferred |
|---|---|---|
| At 1100°C. | 1–80 poises | 1–15 poises |
| At 1500°C. | 0.1–3 poises | 0.1–2 poises |
| Maximum set point | <1150°C. | 1100°C. |

It is to be understood that analytical reported constituents are set forth herein in accordance with standard or conventional chemical analyses practice, which merely means that the cation of a reported oxide is reported on that oxide basis although the cation may not necessarily be present wholly or partly in that form. Thus, iron may exist in divalent form, but it is reported only as the trivalent form for convenience. Also, calcium, sodium or magnesium (or other cation) may exist at least partly as its fluoride, but it is reported only as wholly the indicated oxide thereof while the actual fluoride ion content is also reported as such (which explains why reported example analyses exceed 100%). It is also to be understood that viscosities prescribed herein are determined in accordance with the conventional rotating concentric cylinder procedure as described in the article by H. R. Lillie, J. Amer. Ceram. Soc., 12 (8–29), 505-29. In using that procedure, there comes a point at some temperature at which the viscosity reading is extraordinarily higher (usually due to devitrification occurring in the interval since the previous reading at higher temperature) than the immediately preceding series of readings at higher temperatures (which plot as a continuous smooth curve on which the extraordinarily higher reading does not fit), and that point is referred to as the set point, which is an indication of rigidification of the glass.

As a general rule, the pre-reacted mixture contains, other than constituents noted above, no more than 5% (preferably 2%) by weight of other constituents, such as $TiO_2$, which are not readily reducible and do not significantly alter the noted viscosity characteristics.

For enhancing characteristics of melting rate, protection against oxidation of the molten steel and lubrication, our casting material is a thorough blend of the previously described pre-reacted mixture and finely divided graphite in an amount of up to 10% (preferably 6.5%) by weight of the blend.

A method of making the above-described casting material in accordance with out invention comprises a. thoroughly and intimately mixing a finely divided batch providing the analytical composition described above and having an aggregrate (overall) particle sizing by weight of:

| U.S. Standard Screen | Broad | Preferred |
|---|---|---|
| –120 mesh | at least 75% | at least 85% |
| –200 mesh | at least 60% | at least 70% | b. heating the mixed batch at temperature as follows for time sufficient to cause the sodium and potassium compounds to react with the other ingredients so as to leave no discrete $Na_2O$ and $K_2O$ phase identifiable therein as such, to render the resultant batch chemically homogeneous, and to drive off volatiles such that the resultant batch exhibits a maximum weight loss upon further heating at 900°C. for one hour as follows:

| | Broad | Preferred |
|---|---|---|
| Heating temperature | at least 550° <1000°C. | 650–850°C. |
| Maximum weight loss | 2% | 1% |

When finely divided graphite is blended with the resultant batch of pre-reacted mixture, the particle sizing of the graphite advantageously should be, by weight, at least 75% (preferably 90%) –120 mesh and at least 60% (preferably 80%) –200 mesh, both based on U.S. Standard Sieves.

By virtue of the pre-reacted condition developed in accordance with this invention, it is reasonable to employ extremely caustic sodium hydroxide as the source of $Na_2O$ since the pre-reaction converts it to some complex compound in the mixture whereby the mixture does not exhibit the corrosive and irritating effects of sodium hydroxide. In particular, an aqueous solution of sodium hydroxide is employed to attain the most intimate mixing of the hydroxide with the other ingredients for optimum chemical homogeneity.

DESCRIPTION OF PREFERRED EMBODIMENTS

The following materials (with indicated typical analyses and particle sizing on weight basis) are exemplary batch materials for use in the present invention and were employed in the examples described hereinafter:

Sodium Hydroxide beads or flakes - pure NaOH; becomes finely comminuted and pasty substance (due to absorption of moisture from ambient air) during mixing.

Sodium Hydroxide solution - 50% NaOH, 50% $H_2O$.

Sodium Carbonate - pure $Na_2CO_3$; 94% –12+120 mesh, becomes finely comminuted during mixing.

Calcia-Calcium Fluoride Sludge - 51.7% $CaF_2$, 30.6% CaO, 15.2% $SiO_2$, 1.4% $Na_2O$, 0.8% $Fe_2O_3$, 0.3% $K_2O$; 95% –12 mesh, 67% –120 mesh, 62% –200, becomes more finely comminuted during mixing.

Fluorspar - 97.3% $CaF_2$, 1.1% $CaCO_3$, 1.1% $SiO_2$, 0.5% $Fe_2O_3$; 73% –120 mesh, 42% –200 mesh, becomes more finely comminuted during mixing.

Magnesia - 99% MgO; 97% –120 mesh, 43.5% –200 mesh.

Basalt - 52.0% $SiO_2$, 14.1% $Al_2O_3$, 12.8% $Fe_2O_3$, 9.3% CaO, 6.4% MgO, 3.2% $Na_2O$, 1.2% $K_2O$, 1.0% $TiO_2$; 97.5% –120 mesh, 90% –200 mesh.

Norite - 49% $SiO_2$, 18.7% $Al_2O_3$, 9.4% CaO, 7.9% MgO, 7.6% FeO, 2.9% $Fe_2O_3$, 2.4% $Na_2O$, 0.7% $TiO_2$, 0.5% $K_2O$; 100% –200 mesh.

Diabase Porphyry - 47.3% $SiO_2$, 20.2% $Al_2O_3$, 8.9% FeO, 7.1% CaO, 3.9% $Na_2O$, 3.7% $Fe_2O_3$, 3.2% MgO, 2.2% $K_2O$, 0.8% MnO; 100% –200 mesh.

Hypersthene Gabbro - 50.0% $SiO_2$, 17.4% $Al_2O_3$, 9.5% CaO, 6.5% FeO, 5.5% CaO, 3.4% $Fe_2O_3$, 2.8% $Na_2O$, 1.3% $K_2O$, 1.3% $TiO_2$; 100% –200 mesh.

Volcanic Ash - 76% $SiO_2$, 12.2% $Al_2O_3$, 4.9% $K_2O$, 3.2% $Na_2O$, 0.6% $Fe_2O_3$, 0.5% CaO, 0.1% MgO; 100% −200 mesh.

Portland Cement - 65% CaO, 21% $SiO_2$, 6% $Al_2O_3$, 3% $Fe_2O_3$, 2% MgO; 100% −200 mesh.

Blast Furnace Slag - 32% CaO, 31% $SiO_2$, 18% $Al_2O_3$, 17% MgO, 1% $Na_2O$; ball milled to provide required aggregate batch particle sizing.

Graphite - pure; more than 90% −200 mesh.

TABLE I

| Powder No. | 1 | 2 | 3 | 4 | 5 | 6 | 7 | 8 |
|---|---|---|---|---|---|---|---|---|
| Basalt | 62.8 | 62.8 | 94.5 | 94.5 | 168.0 | 168.0 | 243.0 | 94.5 |
| Sludge | 25.8 | 25.8 | 62.6 | 62.6 | 111.0 | 111.0 | — | 62.6 |
| NaOH beads | 11.4 | 11.4 | 25.7 | 25.7 | 45.0 | 45.0 | 23.0 | — |
| $Na_2CO_3$ | — | — | — | — | 15.0 | 30.0 | 26.0 | 33.5 |
| Magnesia | — | — | 17.2 | 17.2 | 31.0 | 31.0 | — | 17.2 |
| Fluorspar | — | — | — | — | — | — | 71.5 | — |
| Graphite | — | 3.7 | 7.4 | 12.7 | 13.5 | 13.8 | 13.3 | 7.4 |
| $SiO_2$ | 37.5 | 36.0 | 29.0 | 28.2 | 28.4 | 27.7 | 35.3 | 29.1 |
| CaO | 23.9 | 22.9 | 25.4 | 24.7 | 24.1 | 23.5 | 20.6 | 25.4 |
| $Al_2O_3$ | 9.0 | 8.6 | 6.6 | 6.7 | 6.4 | 6.3 | 9.5 | 6.6 |
| $Fe_2O_3$ | 8.4 | 8.0 | 6.2 | 6.2 | 6.0 | 6.0 | 8.6 | 6.24 |
| $Na_2O + K_2O$ | 12.3 | 11.8 | 12.5 | 11.5 | 14.4 | 18.8 | 12.1 | 12.3 |
| MgO | 4.1 | 3.9 | 11.5 | 11.4 | 11.3 | 11.2 | 4.3 | 11.5 |
| F ion | 6.7 | 6.4 | 7.8 | 7.2 | 7.6 | 7.0 | 9.7 | 7.8 |
| Graphite | — | 3.8 | 3.8 | 6.5 | 3.8 | 3.8 | 3.8 | 3.8 |

This invention is not limited to the use of the preceding illustrative materials as other suitable materials for providing the proper chemical analysis will be apparent to the skilled worker in this art. For example, other salts or compounds of sodium and/or potassium may be employed (e.g., nitrates and halides including silicofluorides). Also, other silicate, alkaline and fluoride materials can be selected.

EXAMPLE 1

Eight casting powders were prepared from batch materials with proportions by weight as shown in the upper half of Table I. The sludge was preground in a rotary drum mixer and then dried by heating in a kiln up to 500°C. and cooling at kiln rate after three hours at that maximum temperature. All the dry ingredients except graphite are thoroughly mixed together in the same mixer. Typical aggregate particle sizing of these mixtures is 87% −120 mesh and 75% −200 mesh. For substantially equivalently performing casting powders, the solid NaOH has been omitted in this initial mixing of dry ingredients and then the sodium hydroxide solution (in double weight amount to provide equivalent weight of NaOH) was added to the initial mixture of dry ingredients while mixing thereof continues to yield a thoroughly mixed damp powder. In either case, the batch mixtures were next calcined in a kiln up to 750°C. and then cooled at kiln rate after three hours soak at 750°C. Seven of the calcined batches were then blended with the graphite. Calculated analyses (based on batch material analyses) of the finished blended batches of casting powders are shown in the lower part of Table I in analytical weight percent values (as earlier discussed herein).

When these casting powders were melted to form glasses, those respective glasses exhibited the viscosity characteristics as set forth in Table II.

Table II

| Powder No. | Viscosity (in poises) at 1500°C. | at 1100°C. | Set Point °C. |
|---|---|---|---|
| 1 | 2.0 | 30 | 805 |
| 2 | 2.0 | 30 | 805 |
| 3 | 0.7 | 5.0 | 991 |
| 4 | 0.7 | 5.0 | 991 |
| 5 | 0.8 | 4.0 | 1001 |
| 6 | 0.8 | 5.0 | 990 |
| 7 | 1.2 | 16 | 879 |
| 8 | 0.5 | 4.5 | 964 |

Upon subjecting these casting powders to a weight loss test by heating at 900°C. for one hour, it has generally been found that they exhibit weight losses of less than 1%, although in some cases it has amounted to as high as 1.5% or so (but less than 2%). Thus, they exhibit relatively good stability against absorption of volatiles, such as moisture or carbon dioxide. For example, a sample of Powder No. 3 held for 66 hours at 43°C. and 80% relative humidity exhibited a weight gain of only 0.7%. This stability is further illustrated by the weight gain data in Table III determined on samples of Powder No. 3 heated or calcined at temperatures other than 750°C. Accelerated shelf-life tests have been performed on the above-described casting powders by subjecting them to 98% relative humidity at 50°C. until weight gain reaches a maximum and then allowing them to sit in ordinary air atmosphere until weight loss levels off to some constant weight value. The latter value generally does not exceed 3–4% weight gain over the original sample weight. On the other hand, powders that were not adequately calcined (i.e., at temperatures below 550°C.), show final accelerated test weight values ranging upward from about 5% and also show weight gains of more than 12% from ordinary shelf existence without accelerated test. For example, a sample of calcined Powder No. 3 exhibiting 2.6% weight loss on heating at 900°C. for one hour, also exhibited an accelerated shelf-life test weight gain of 5.7%.

TABLE III

| Temp. °C. | Time Hrs. | Initial Wgt. gms | Wgt. After 4 hrs. 98% Relative Humidity 50°C. | Wgt. After 24 hrs. at Ambient Conditions | Wgt. After 88 hrs. at Ambient Conditions |
|---|---|---|---|---|---|
| 400 | 1/2 | 50 | 58.4 g | 57.6 g | 55.6 g |
| 650 | 1/2 | 50 | 53.4 g | 52.5 g | 51.1 g |
| 950 | 1/2 | 50 | 50.5 g | 50.4 g | 50.2 g |

As added protection to possible undesirable weight gain as well as providing a convenient packaging, the finished calcined casting powders are sealed in 4 mil thick plastic bags for shipment to users.

X-diffraction patterns of the finished calcined powders show the existence of multiple crystal phases, but are too complex for identifiable specific resolution of each phase. Nevertheless, chemical homogeneity has been ascertained by separating three screened particle size portions of the dry batch, of the damp batch powder and of the calcined batch powder, and then chemically analyzing each portion for $Na_2O$, $Fe_2O_3$ and F ion. This is illustratively shown by the data in Table IV for a sample of Powder No. 3 wherein NaOH was added as the 50% solution. $Na_2O$ is primarily provided by NaOH, $Fe_2O_3$ is primarily provided by basalt and the sludge is the source of fluorine. Considerable variation in analyzed amounts of each constituent exists between the three portions of the dry and wet mix of batch. However, the calcined powder evidences rather uniform amounts those these constituents in all three portions. Such chemical homogeneity results from the prescribed calcining while still leaving the resultant powder in substantially unfused state with multiple crystalline phases.

In fact, it appears that only the NaOH has fused and reacted with the other ingredients to form the complex substantially unfused powder. Such chemical combination of the alkali is evidenced by the differing pH data in Table V determined from deionized water in separate containers with one containing sample of uncalcined batch mixture for Powder No. 3 and the other containing sample of calcined Powder No. 3, each in concentration of 10 grams of sample to 1000 milliliters of water. The characteristically high pH of highly caustic discrete NaOH is not found in the case of the pre-reacted calcined sample. Moreover, standard skin irritation tests on adult albino rabbits pursuant to the U.S. Code of Federal Regulations 191.11 evidenced severe erythema (reddening) and slight edema (swelling) resulting from the green (uncalcined) batch sample whereas the sample of calcined powder evidenced no edema and none to hardly perceptible erythema. Thus, chemical homogeneity of the powder also insures against health hazard for use of the powder when economical caustic hydroxide is employed to provide the $Na_2O$ or $K_2O$ required in the composition of powders in accordance with this invention.

TABLE IV

| Particle Size Portion | Analysis in weight percent | | |
| --- | --- | --- | --- |
| | $Na_2O$ | $Fe_2O_3$ | $F^-$ |
| Dry mix on 80 mesh | — | 4.27 | 18.3 |
| Dry mix on 200 mesh | — | 6.57 | 3.25 |
| Dry mix in Pan | — | 8.59 | 9.84 |
| Wet mix on 80 mesh | 14.6 | 6.79 | 9.63 |
| Wet mix on 200 mesh | 9.28 | 6.75 | 4.87 |
| Wet mix in Pan | 15.87 | 7.28 | 9.92 |
| Calcined powder on 80 mesh | 13.4 | 7.28 | 7.4 |
| Calcined powder on 200 mesh | 11.4 | 6.7 | 6.59 |

TABLE IV-continued

| Particle Size Portion | Analysis in weight percent | | |
| --- | --- | --- | --- |
| | $Na_2O$ | $Fe_2O_3$ | $F^-$ |
| Calcined powder in Pan | 14.99 | 7.72 | 8.64 |

TABLE V

| | pH at 0 hrs. | pH at 24 hrs. |
| --- | --- | --- |
| Uncalcined | 12.2 | 12.2 |
| Calcined | 9.9 | 9.4 |

Sample lots of these eight casting powders were subjected to field test trials including continuous casting of:

a. Al-killed carbon and low alloy steels at tundish temperatures of about 1550°C. in molds of cross-sectional sizes 9 × 34–38 inches at rates of about 36–38 inches per minute (ipm) with powder-glass cover thickness on top of molten steel of about ½–2 inches and powder consumption rates of about 1.3–2.5 pounds per ton of steel cast;

b. Si-killed steels at about 1550°C. in molds of 9 × 85 inches size at a rate of about 30 ipm with cover thickness and consumption similar to that in (a) above; and c. 304 stainless steel at about 1500°C. in molds of 5 × 52 inches size at a rate of about 36 ipm with cover thickness as above and consumption rates of about 1.9 lbs/ton of steel.

In these field trials, the powders were observed to melt very rapidly and uniformly to cover the molten steel without significant formation of viscous stringers that did not become absorbed or "dissolved" in the adjacent fluid glass covering. The steel castings produced with these powders were judged by the steelmakers to be of first quality with fairly low levels of spot scarfable pin holes, cracks and/or surface deposits.

Comparative field test trials were made of granular casting material No. 3 as calcined properly at 750°C. and similar granular casting material except that it was merely dried of free water at 210°C. for 1.5 hours instead of proper pre-reaction calcination according to this invention. The calcined powder had a 1–1.5% weight loss on heating at 800°C. for one hour whereas the uncalcined powder had 12–13% weight loss under the same thermal treatment. Steel castings produced with these two powders were judged by the steelmaker as follows:

| Steel Character | 750°C. Calcined Powder No. 3 | 210°C. Dried Powder No. 3 |
| --- | --- | --- |
| First quality (for sheet) | 100% | 94.2% |
| Second quality (for bar, etc.) | 0% | 5.8% |
| Good slabs without deep cracks and heavy deposits | 83% | 74.8% |

The principal defects caused by the improperly calcined casting material were pin holes and deposits, with the former being the major defect. The comparative data points out the importance of the pre-reacted nature of the calcined material for good performance results in continuous casting of steel.

It should also be noted that a field test trial of granular casting material formed by complete prefusion of Powder No. 3 to yield a frit evidenced low melting rate of that frit casting material and formation of viscous stringers not absorbable by the adjacent fluid glass such that performance of it was judged unacceptable. That data points out the fact that total prefusion of earlier practice to provide chemical homogeneity and minimal volatiles in a casting powder is not adequate for good performance.

EXAMPLE 2

Five other casting powders were prepared, using the procedures of Example 1, from batch materials with proportions by weight as shown in the upper half of Table VI. Typical aggregate particle sizing of these mixtures were substantially the same as for those of Example 1. Calculated analyses of the finished blended batches of the powders are shown in the lower part of Table VI in analytical weight percent values. These calcined powders exhibited less than 2% (mostly less than 1%) weight loss on heating at 900°C for one hour. They also exhibited not more than 4% weight gain resulting from the accelerated shelf-life test previously described. The viscosity characteristics of the glasses resulting from melting these powders are set forth in Table VII.

TABLE VI

| Powder No. | 9 | 10 | 11 | 12 | 13 |
|---|---|---|---|---|---|
| Volcanic Ash | 7.0 | 5.0 | — | — | — |
| Portland Cement | 5.0 | — | — | — | — |
| Blast Furnace Slag | — | 7.0 | — | — | — |
| Norite | — | — | 94.5 | — | — |
| Diabase Porphyry | — | — | — | 94.5 | — |
| Hypersthene Gabbro | — | — | — | — | 94.5 |
| Basalt | 35.0 | 35.0 | — | — | — |
| Sludge | 30.9 | 30.9 | 62.6 | 62.6 | 62.6 |
| NaOH beads | 12.6 | 12.6 | 25.7 | 25.7 | 25.7 |
| Magnesia | 8.5 | 8.5 | 17.2 | 17.2 | 17.2 |
| Graphite | 3.8 | 3.9 | 7.4 | 7.4 | 7.4 |
| $SiO_2$ | 29.3 | 28.9 | 25.6 | 24.5 | 26.3 |
| CaO | 27.6 | 26.5 | 25.0 | 23.9 | 25.1 |
| $Al_2O_3$ | 6.1 | 6.8 | 8.0 | 8.5 | 7.5 |
| $Fe_2O_3$ | 4.9 | 4.7 | 8.6 | 10.0 | 7.9 |
| $Na_2O + K_2O$ | 12.8 | 12.3 | 11.5 | 12.3 | 12.1 |
| MgO | 10.8 | 11.9 | 11.9 | 9.8 | 10.9 |
| F ion | 7.8 | 7.8 | 7.8 | 7.8 | 7.8 |
| Graphite | 3.8 | 3.8 | 3.8 | 3.8 | 3.8 |

TABLE VII

| Powder No. | Viscosity (in poises) at 1500°C. | at 1100°C. | Set Point °C. |
|---|---|---|---|
| 9 | 0.6 | 5.0 | 964 |
| 10 | 0.6 | 5.0 | 967 |
| 11 | 0.8 | 9.0 | 986 |
| 12 | 0.6 | 6.0 | 881 |
| 13 | 0.7 | 5.5 | 969 |

These five pre-reacted powders blended with and without graphite exhibited very rapid uniform melting and were judged to have performance capabilities similar to the eight casting powders of Example 1. Accordingly, this example further illustrates permissible variations in suitable batch materials that may be employed so long as they provide the proper composition and have proper fine particle sizing for intimate mixing that will yield the novel pre-reacted substantially unfused granular casting material upon proper calcining.

We claim:

1. A particulate casting material to be applied onto the upper surface of molten steel in a vertical continuous casting mold therefor and characterized by melting on the surface of the molten steel to form a protective flux-lubricant molten glass which also flows down between the solidifying cast steel and the mold wall,
wherein the improvement comprises the material being composed essentially of a substantially chemically homogeneous, pre-reacted, but substantially unfused mixture of multiple crystalline phases
a. analytically consisting essentially of, by weight of the mixture:
20–45% $SiO_2$,
10–40% CaO, SrO, BaO and combinations thereof,
0–10% $Al_2O_3$
0–11% $Fe_2O_3$
5–25% $Na_2O$, $K_2O$ and combinations thereof,
0–15% MgO,
3–15% fluorine ion,
b. exhibiting not more than 2% weight loss upon being heated at 900°C for one hour, and
c. which uniformly and rapidly melts at temperatures of molten steel to form a fluid glass having the following viscosity characteristics:
1–80 poises at 1100°C.,
0.1–3 poises at 1500°C., and
a set point less than 1150°C.
2. The material of claim 1 consisting of a thorough blend of said mixture with up to 10% by weight finely divided graphite.
3. The material of claim 1 wherein said mixture —
a. analytically consists essentially of, by weight:
25–40% $SiO_2$,
20–35% CaO,
6–10% $Al_2O_3$,
6–11% $Fe_2O_3$,
10–20% $Na_2O + K_2O$,
4–15% MgO,
6–12% fluorine ion,
b. exhibits not more than 1% weight loss upon being heated at 900°C. for one hour, and
c. melts to form a fluid glass having the following viscosity characteristics:
1–15 poises at 1100°C.,
0.1–2 poises at 1500°C., and
a set point not exceeding 1100°C.
4. The material of claim 3 consisting of a thorough blend of said mixture with up to 6.5% by weight finely divided graphite.
5. A method of making a particulate casting material to be applied onto the upper surface of molten steel in a vertical continuous casting mold therefor and comprising thoroughly mixing batch materials that melt on the surface of the molten steel to form a protective flux-lubricant molten glass covering which also flows down between the solidifying cast steel and the mold wall, wherein the improvement comprises a. thoroughly and intimately mixing a batch having an aggregate particle sizing by weight of:
 at least 75% −120 mesh U.S. Standard Sieve,
 at least 60% −200 mesh U.S. Standard Sieve,
analytically consisting essentially of, by weight:
 20–45% $SiO_2$,
 10–40% CaO, SrO, BaO and combinations thereof,
 0–10% $Al_2O_3$
 0–11% $Fe_2O_3$
 5–25% $Na_2O$, $K_2O$ and combinations thereof,
 0–15% MgO,
 3–15% fluorine ion,
 0–3% $TiO_2$, and b. heating the mixed batch at temperature of at least 550° to less than 1000°C. for time sufficient to cause the sodium and potassium compounds to react with the other ingredients so as to leave no discrete $Na_2O$ and $K_2O$ phase identifiable therein as such, to render the resultant batch chemically homogeneous, and to drive off volatiles so as to render the resultant batch capable of exhibiting not more than 2% weight loss upon further heating at 900°C. for one hour.

6. The method of claim 5 wherein the resultant batch is thoroughly blended with up to 10% by weight finely divided graphite of particle sizing by weight being at least 75% −120 mesh and at least 60% −200 mesh U.S. Standard Sieves.

7. The method of claim 5 wherein —
a. the batch has a particle sizing by weight of:
 at least 85% −120 mesh U.S. Standard Sieve,
 at least 70% −200 mesh U.S. Standard Sieve,
b. the batch analytically consists essentially of, by weight:
 25–40% $SiO_2$,
 20–35% CaO,
 6–10% $Al_2O_3$,
 6–11% $Fe_2O_3$,
 10–20% $Na_2O + K_2O$,
 4–15% MgO,
 6–12% fluorine ion,
 0–2% $TiO_2$, and
c. the heating of the mixed batch is at temperature of 650°–850°C. and the weight loss of the resultant batch is not more than 1%.

8. The method of claim 7 wherein the resultant batch is thoroughly blended with up to 6.5% by weight finely divided graphite of particle sizing by weight being at least 90% −120 mesh and 80% −200 mesh U.S. Standard Sieves.

9. The method of claim 7 wherein the $Na_2O$ content of the batch is provided by an aqueous solution of NaOH.

10. The material of claim 2 wherein the graphite is of particle sizing by weight being at least 75% −120 mesh and at least 60% −200 mesh U.S. Standard Sieves.

* * * * *

UNITED STATES PATENT OFFICE
CERTIFICATE OF CORRECTION

PATENT NO. : 3,964,916
DATED : June 22, 1976
INVENTOR(S) : William H. Armistead et al It is certified that error appears in the above-identified patent and that said Letters Patent are hereby corrected as shown below:

Column 1, line 38, delete "powder".

Column 1, line 39, delete one occurrence of "casting".

Column 1, line 39, after "casting" insert -- powder -- .

Column 7, line 21, after "amounts" insert -- of -- .

Column 7, line 21, delete "these".

Signed and Sealed this

Twenty-eighth Day of September 1976

[SEAL]

Attest:

RUTH C. MASON
Attesting Officer

C. MARSHALL DANN
Commissioner of Patents and Trademarks